United States Patent
Chiu

(10) Patent No.: US 7,358,945 B2
(45) Date of Patent: Apr. 15, 2008

(54) LIQUID CRYSTAL DISPLAYS WITH IMPROVED GRAY-SCALE

(75) Inventor: Chun-Chang Chiu, Tao Yuan Shien (TW)

(73) Assignee: AU Optronics Corp., Hsinchu (TW)

( * ) Notice: Subject to any disclaimer, the term of this patent is extended or adjusted under 35 U.S.C. 154(b) by 588 days.

(21) Appl. No.: 11/021,049

(22) Filed: Dec. 23, 2004

(65) Prior Publication Data
US 2006/0007082 A1 Jan. 12, 2006

(30) Foreign Application Priority Data
May 28, 2004 (TW) ................. 93115232 A

(51) Int. Cl.
*G09G 3/36* (2006.01)
(52) U.S. Cl. ............... 345/87; 349/42; 349/43; 345/92; 257/59; 257/72
(58) Field of Classification Search ............ 349/48, 349/42, 43; 345/89, 92, 87; 257/59, 72
See application file for complete search history.

(56) References Cited
U.S. PATENT DOCUMENTS
5,717,474 A 2/1998 Sarma

2003/0025661 A1 2/2003 Karman et al.
2003/0128323 A1* 7/2003 Matsumoto et al. ........ 349/141
2004/0094766 A1* 5/2004 Lee et al. .................... 257/72

FOREIGN PATENT DOCUMENTS
CN 1501152 A 6/2004
EP 0438138 7/1991

OTHER PUBLICATIONS
European Office Action mailed Mar. 21, 2006.
China Office Action mailed Dec. 8, 2006.

* cited by examiner

*Primary Examiner*—David Nelms
*Assistant Examiner*—Thanh-Nhan P Nguyen
(74) *Attorney, Agent, or Firm*—Thomas, Kayden, Horstemeyer & Risley

(57) ABSTRACT

A liquid crystal display with improved gray-scale display. The liquid crystal display includes a plurality of pixel areas, each including first and second substrates disposed opposite each other and a liquid crystal layer interposed therebetween. A first pixel electrode and a first pixel driving device electrically connected thereto are formed on part of the first substrate. A second pixel electrode and a second pixel driving device electrically connected thereto are formed on part of the first substrate. A common electrode is formed on the interior of the second substrate. The first and second pixel driving devices have mutually different ON currents, resulting in the first and second pixel electrodes having mutually different voltages.

14 Claims, 6 Drawing Sheets

LIQUID CRYSTAL DISPLAYS WITH IMPROVED GRAY-SCALE

BACKGROUND

The invention relates to active liquid crystal displays, and more particularly to liquid crystal displays with improved gray-scale.

In a conventional TN (twisted nematic) mode liquid crystal display, gray-scale inversion in half tones of gray is an issue for viewing angle characteristics. In TN mode liquid crystal displays, gray-scale inversions do not easily occur in the upward and horizontal directions, but they easily occur in the downward direction. FIG. 1 shows viewing-angle dependence of relative luminance difference in the normally white mode for a conventional TN mode liquid crystal display in the downward direction. Curves 12, 23, 34 and 45 show the viewing-angle dependence of relative luminance difference between gray-scale gradations 1 and 2, 2 and 3, 3 and 4 and 4 and 5, respectively. As is apparent from FIG. 1, when the conventional TN mode liquid crystal display is observed at about 20°, the relative luminance difference of curve 34 is 0 and it is understood that the gray-scale inversion GS occurs such that the display quality markedly deteriorates from the downward direction.

U.S. Pat. No. 6,342,939 to Hirata et al., the entirety of which is hereby incorporated by reference, discloses a liquid crystal display with improved viewing characteristics, comprising a pair of opposing transparent substrates with a liquid crystal layer interposed therebetween. A transparent electrode is formed on the liquid crystal layer side of each of the substrates. The opposing transparent electrodes disposed in pairs have two or more different cell gaps at least within one display area of a pixel.

U.S. patent application Publication Ser. No. 2002/0105614 to Nakayama et al., the entirety of which is hereby incorporated by reference, discloses an array substrate of a liquid crystal display. In the array substrate, a second pixel electrode is disposed in a layer above an insulating layer which is itself disposed in a layer above a first pixel electrode. The second pixel electrode is electrically connected to the first pixel electrode and has a region that does not overlap the first pixel electrode, improving viewing angle characteristics.

SUMMARY

Liquid crystal displays with improved gray-scale (or viewing angle characteristics) are provided. An exemplary embodiment of a liquid crystal display comprises a plurality of pixel areas, each comprising a first substrate and a second substrate disposed opposite each other with a liquid crystal layer interposed therebetween. A first pixel electrode and a first pixel driving device are formed on part of the first substrate, wherein the first pixel electrode is electrically connected to the first pixel driving device. A second pixel electrode and a second pixel driving device are formed on part of the first substrate, wherein the second pixel electrode is electrically connected to the second pixel driving device. A common electrode is formed on an interior of the second substrate. The first and second pixel driving devices have mutually different ON currents ($I_{on}$), resulting in the first and second pixel electrodes having mutually different voltages.

Another exemplary embodiment of a liquid crystal display comprises a plurality of pixel areas, each comprising a transversely extending gate line and a longitudinally extending source line formed on a first substrate. A thin film transistor is disposed in a vicinity of an intersection of the gate line and the source line, wherein the thin film transistor comprises a first drain and a second drain. A first pixel electrode with a first area is electrically connected to the source line via the first drain to cause the first pixel electrode having a first voltage. A second pixel electrode with a second area is electrically connected to the source line via the second drain, causing the second pixel electrode to have a second voltage. A voltage drop occurs between the first and second voltages. A second substrate opposite the first substrate is provided. A common electrode is formed on the interior of the second substrate. A liquid crystal layer is interposed between the first substrate and the second substrate.

Further, the embodiments of the first and second pixel driving devices can be two thin film transistors comprising the same gate, the same channel layer, the same source and two different drains (i.e. a first drain and a second drain).

Each pixel area of the liquid crystal comprises a first pixel electrode and a second pixel electrode having mutually different voltages. The first and second pixel electrodes are respectively electrically connected to the first and second pixel driving devices having mutually different ON currents, causing the liquid crystal layer comprising two liquid crystal orientation areas having mutually different orientation directions. The angle at which the gray-scale inversion occurs is thus widened downward, improving viewing angle characteristics.

Further scope of applicability of embodiments of the disclosure will become apparent from the detailed description given hereinafter. It should be understood that the detailed description and specific examples are given by way of illustration only, since various changes and modifications within the spirit and scope of the disclosure will become apparent to those skilled in the art from this detailed description.

DESCRIPTION OF THE DRAWINGS

Liquid crystal displays with improved gray-scale can be more fully understood by reading the subsequent detailed description in conjunction with the examples and references made to the accompanying drawings, wherein.

DETAILED DESCRIPTION

First Embodiment

Figure 1:
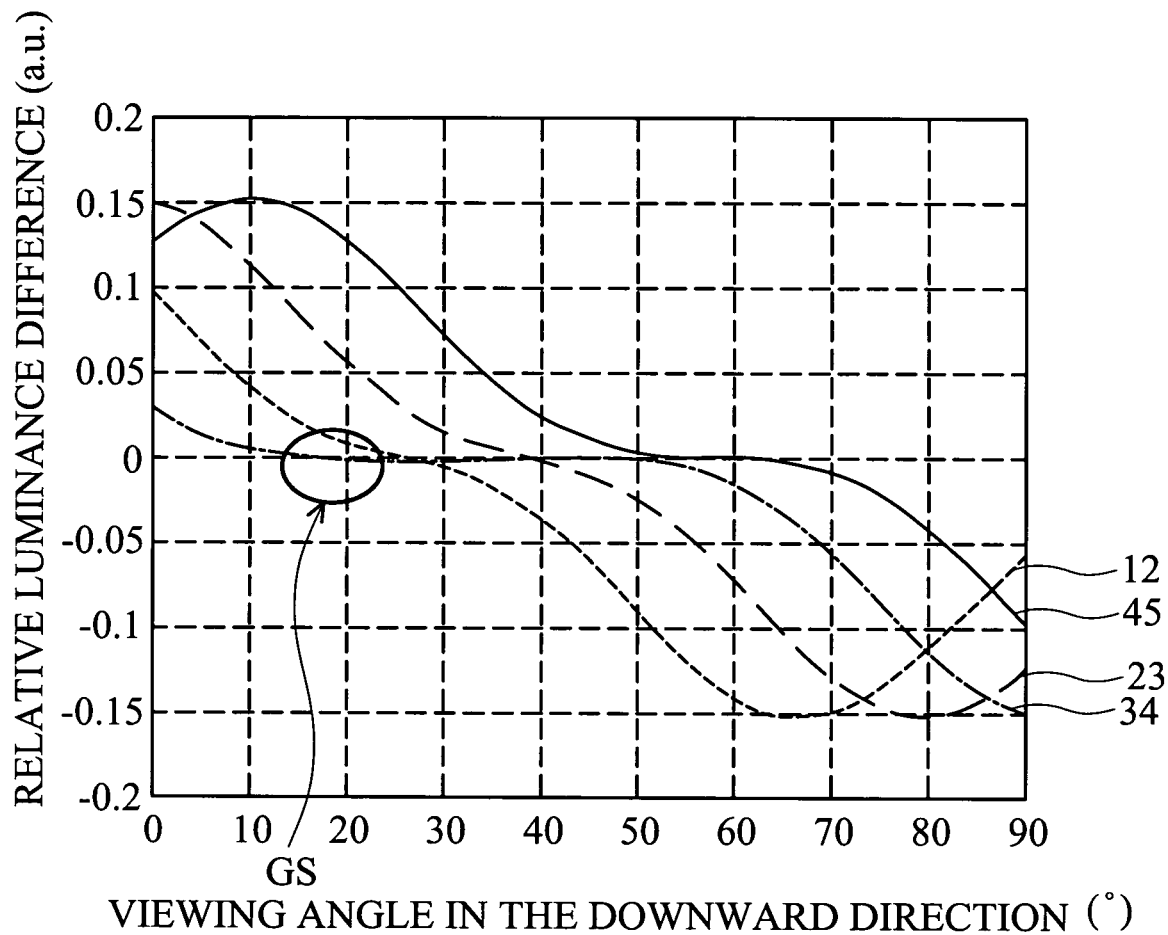
FIG. 1 shows viewing-angle dependence of relative luminance difference in the normally white mode for a conventional TN mode liquid crystal display in the downward direction.
Figure 2:
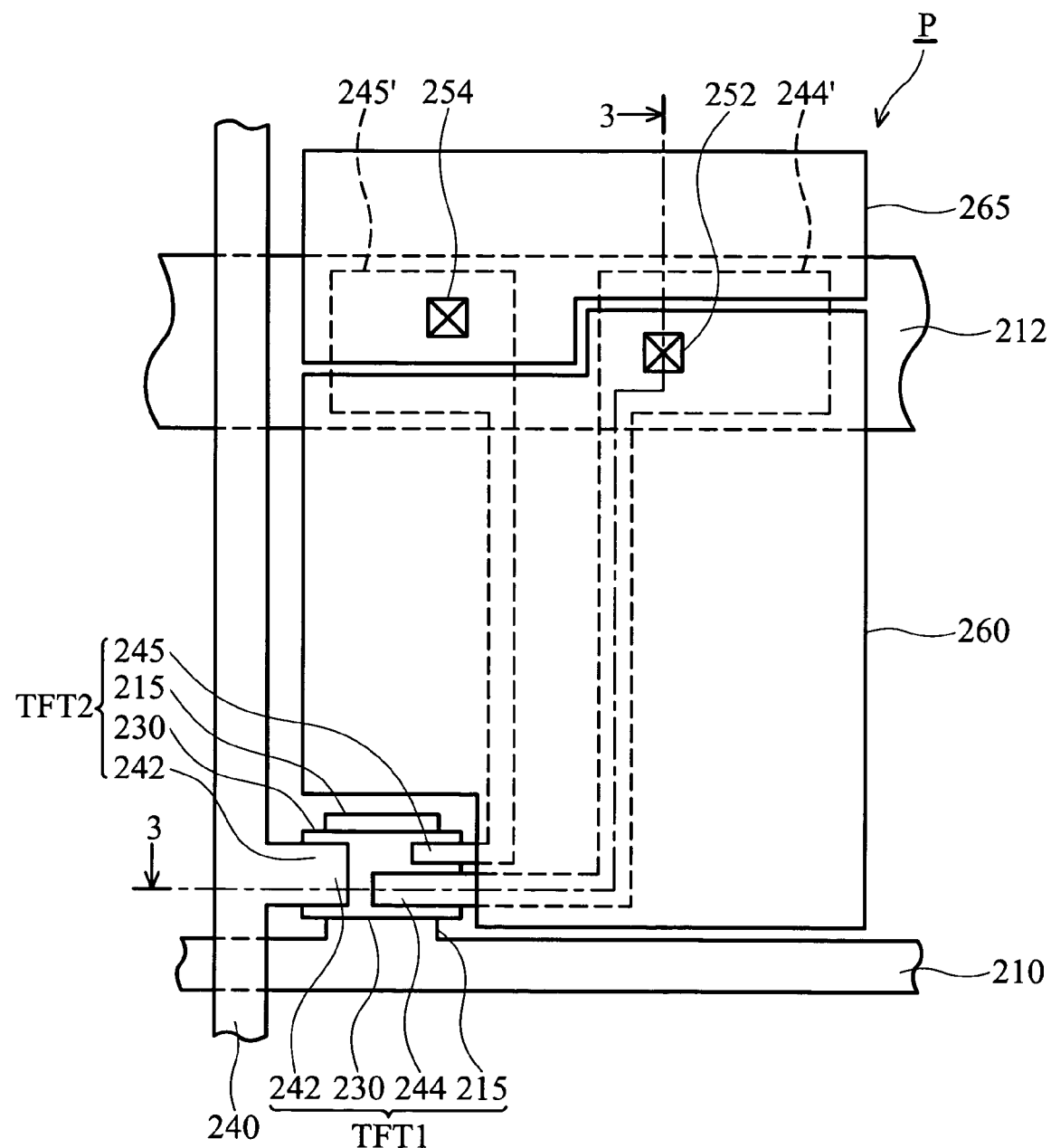
FIG. 2 is a plan view of an embodiment of a pixel area in an array substrate of a first embodiment of a liquid crystal display.
Figure 3:
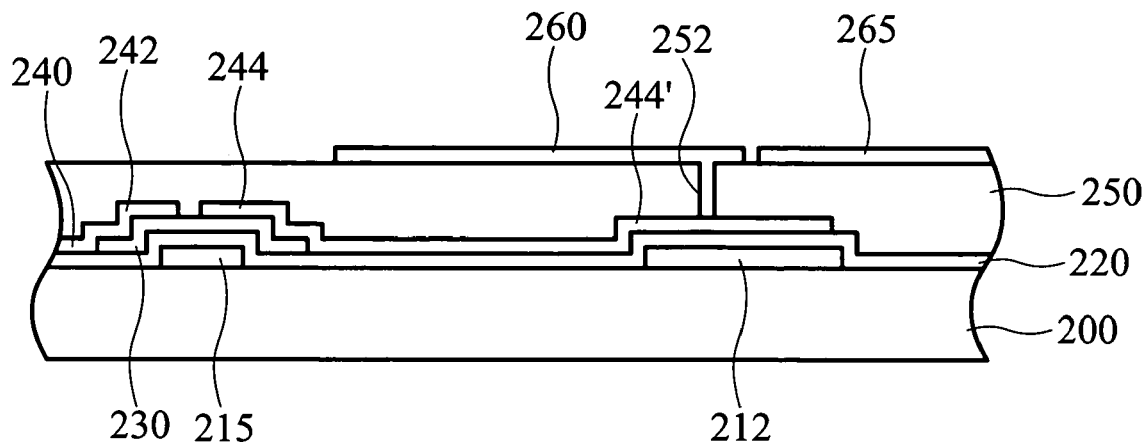
FIG. 3 is a sectional view of the pixel area taken along line 3-3 of FIG. 2.
Figure 6:
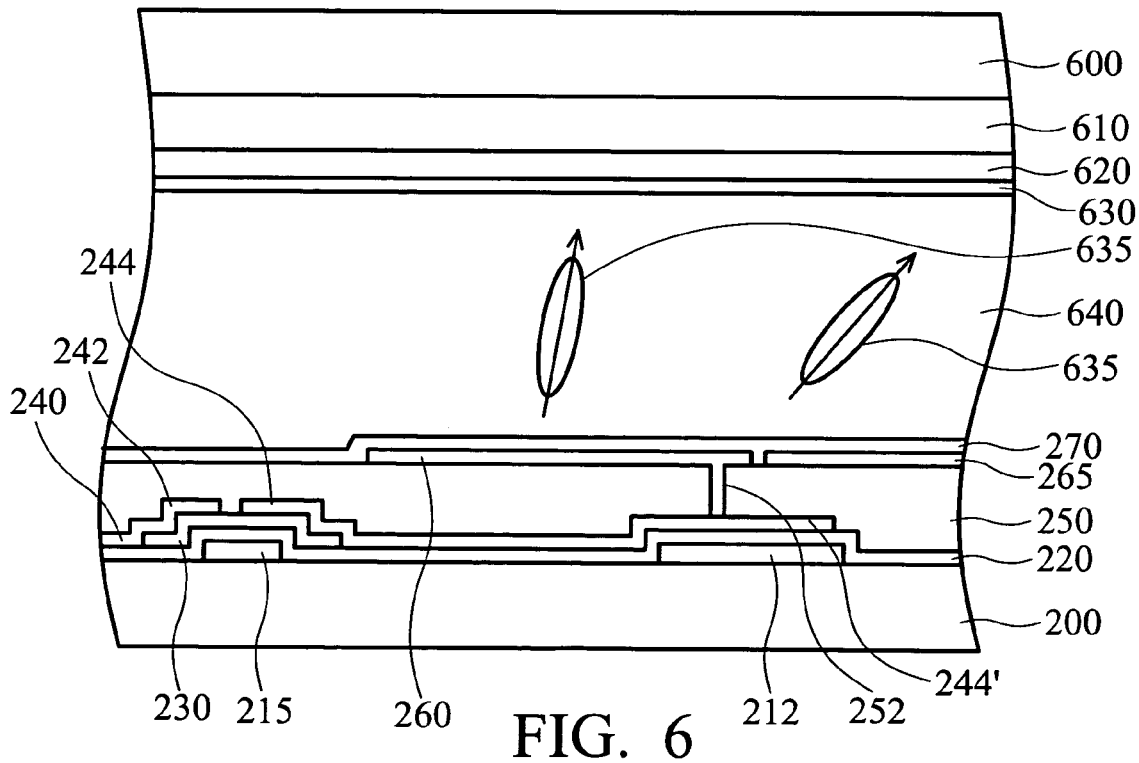
FIG. 6 is a sectional view of the first embodiment of the liquid crystal display.

FIG. 2 is a plan view of an embodiment of a pixel area in an array substrate of the first embodiment of a liquid crystal display. FIG. 3 is a sectional view of the pixel area P taken along line 3-3 of FIG. 2. FIG. 6 is a sectional view of the liquid crystal display comprising an array substrate, opposing substrate and liquid crystal interposed therebetween. In FIG. 2, the liquid crystal display comprises a plurality of pixel areas P arranged in an array matrix. The pixel areas P are defined by crossing gate and source (or data) lines 210 and 240. In order to simplify the illustration, FIGS. 2 and 6 show one pixel area P, although there may be numerous pixel areas P.

In FIGS. 2 and 3, a transversely extending gate line 210 and a transversely extending storage capacitance electrode line 212 (hereinafter referred to as Cs line) are disposed on part of a first substrate 200. The first substrate 200, serving as a lower substrate 200, can be glass or quartz. The gate line 210 comprises a protrusion serving as a gate 215. The gate line 210 and the Cs line 212 can comprise Al, Cr, Mo or other conductive material. The gate line 210 and the Cs line 212 can be simultaneously formed by the same deposition. A gate insulating layer 220 then thoroughly overlies the first substrate 200. The gate insulating layer 220 can be $SiO_2$ formed by, for example, deposition.

A semiconductor layer 230, serving as a channel layer 230, overlies part of the gate insulating layer 220. The channel layer 230 can be silicon formed by, for example, deposition.

A longitudinally extending source line 240 is disposed on part of the gate insulating layer 220. The source line 240 comprises a source 242 extended onto part of the channel layer 230. A first drain 244 and a second drain 245 are disposed on part of the channel layer 230 and the gate insulating layer 220. The first drain 244 comprises a first extending portion 244' overlapped with part of the Cs line 212. The second drain 245 comprises a second extending portion 245' overlapped with part of the Cs line. The source line 240, the source 242 and the drains 244 and 245 can comprise Al, Cr, Mo or other conductive material. The source line 240, the source 242 and the drains 244 and 245 can be simultaneously formed by the same deposition procedure. Thus, the gate 215, the gate insulating layer 220, the channel layer 230, the source 242 and the first drain 244 constitute a first thin film transistor (TFT1) serving as a first pixel driving device. The gate 215, the gate insulating layer 220, the channel layer 230, the source 242 and the second drain 245 constitute a second thin film transistor (TFT2) serving as a first pixel driving device. The thin film transistors TFT1 and TFT2 serve as switching elements to apply electric charges/discharges to the pixel electrodes described in the following. It is noted that the thin film transistors TFT1 and TFT2 have mutually different ON currents ($I_{on}$).

Although in this instance the thin film transistors TFT1 and TFT2 share the same gate 215, the same channel layer 230 and the same source 242, the thin film transistors TFT1 and TFT2 can also be two independent devices with two different gates, channel layers, sources and drains. In order to avoid obscuring aspects of the disclosure, formation of the two independent thin film transistors is not described here.

An insulating layer 250 thoroughly overlies the first substrate 200. The insulating layer 250 can be organic or inorganic formed by, for example, deposition or coating. By performing photolithography and etching on the insulating layer 250, a first hole 252 exposing the first extending portion 244' and a second hole 254 exposing the second extending portion 245' are formed. A first pixel electrode 260 with a first area (A1) and a second pixel electrode 265 with a second area (A2) are then defined on the insulating layer 250. The first pixel electrode 260 fills the first hole 252 to electrically connect the first drain 244 and the second pixel electrode 265 fills the second hole 254 to electrically connect the second drain 245 simultaneously. Since thin film transistors TFT1 and TFT2 have mutually different ON currents ($I_{on}$), the first pixel electrode 260 has a first voltage (V1) and the second pixel electrode has a second voltage (V2). Note that a voltage drop ($\Delta V$) occurs between the first voltage (V1) and the second voltage (V2).

Figure 4:
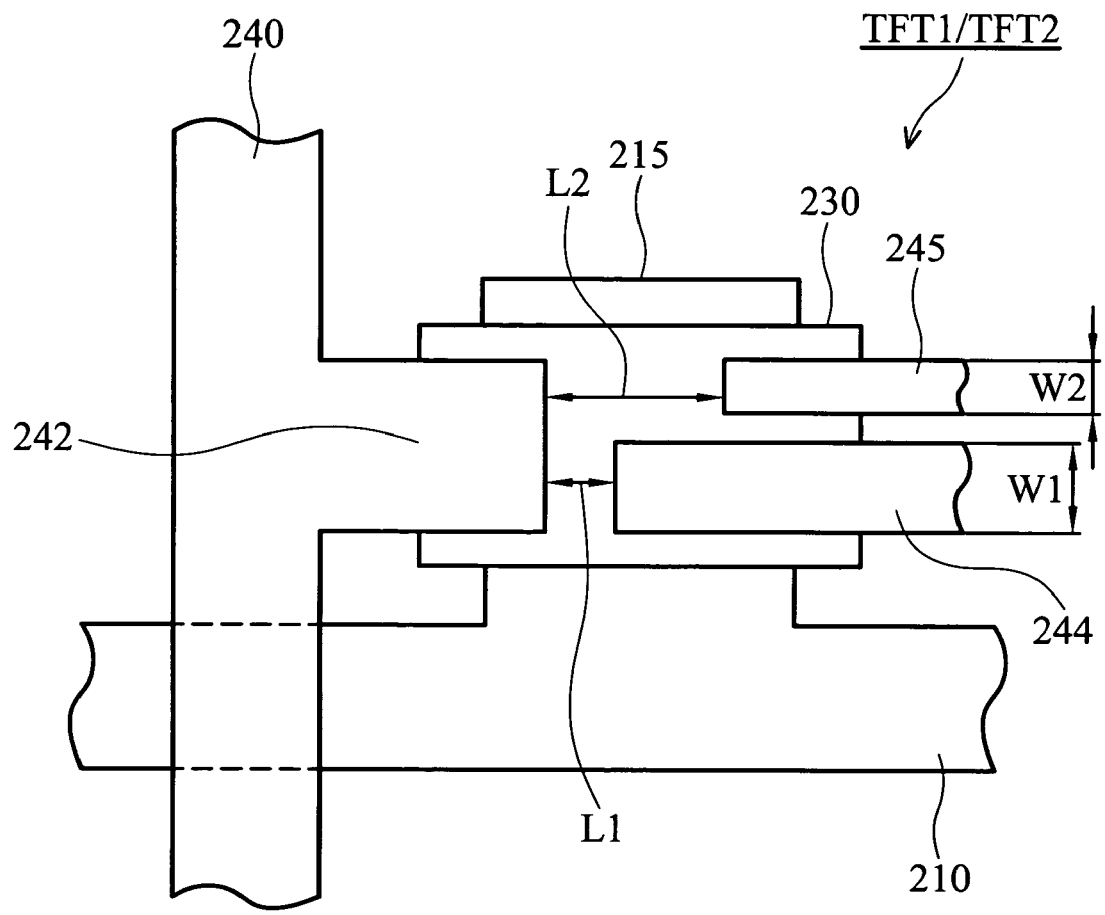
FIG. 4 is an enlarged diagram showing an embodiment of the configuration of first and second thin film transistors.
Figure 5:
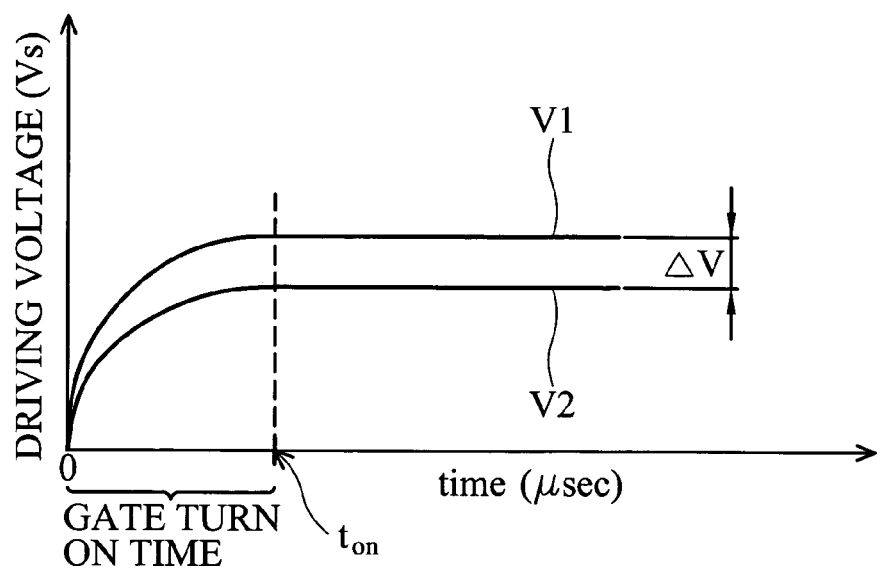
FIG. 5 is a graph depicting an embodiment of the operation of the first and second thin film transistors.

FIGS. 4 and 5 are used to explain the first and second pixel electrodes 260 and 265 having mutually different voltages. FIG. 4 is an enlarged diagram showing an embodiment of the configuration of first and second thin film transistors TFT1 and TFT2. FIG. 5 is a graph for explaining the operation of first and second thin film transistors TFT1 and TFT2. Referring to FIG. 4, the first drain 244 has a first width (W1), the second drain 245 has a second width (W2), a first interval (L1) exists between the first drain 244 and the source 242 and a second interval (L2) exists between the second drain 245 and the source 242. It is noted that a relationship between W1, W2, L1 and L2 satisfies W1/L1W≠W2/L2, causing thin film transistors TFT1 and TFT2 having mutually different ON currents ($I_{on}$). Referring to FIG. 5, when the source line 240 applies a driving voltage (Vs) to the thin film transistors TFT1 and TFT2 and the gate turn on time ($t_{on}$) of the gate 215 is set to about 10~30 μsec, a voltage drop ($\Delta V$) occurs between the charged pixel electrodes 260 and 265 due to the thin film transistors TFT1 and TFT2 having mutually different ON currents ($I_{on}$).

In FIG. 6, an alignment film 270 is disposed on the pixel electrodes 260 and 265 and the insulating layer 250. A second substrate 600 is provided opposite the first substrate 200. The second substrate 600 can be a glass substrate comprising a color filter 610 formed thereon. A common electrode 620 is disposed on the interior of the color filter 610. The common electrode 620 can be ITO or IZO formed by, for example, deposition. Another alignment film 630 is disposed on the common electrode 620.

A liquid crystal material, such as TN (twisted nematic) type liquid crystal molecules 635, is then filled in a space between the first substrate 200 and the second substrate 600, constituting a liquid crystal layer 640. The thickness of the liquid crystal layer 640 is about 2~10 μm, preferably, 5 μm. Since the first voltage (V1) of the first pixel electrode 260 is different from the second voltage (V2) of the second pixel electrode 265, the liquid crystal molecules 635 have different orientation directions (shown by arrows) above the first and second pixel electrodes 260 and 265. That is, the liquid crystal layer 635 comprises two liquid crystal orientation areas having mutually different orientation directions. Thus, the gray-scale inversion (or viewing angle characteristics) is improved.

Figure 7:
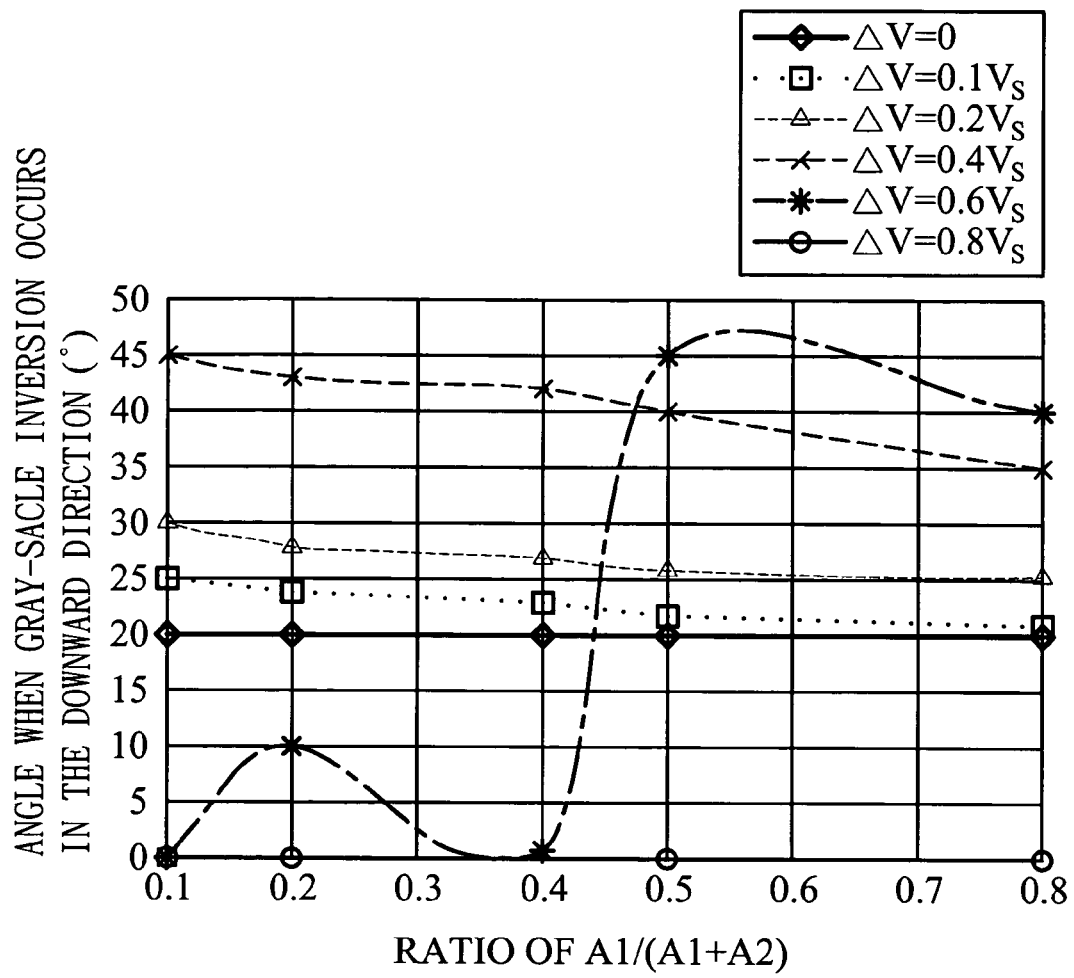
FIG. 7 is a graphical plot of the relationship between the ratio of A1/(A1+A2) and the angle when gray-scale inversion occurs in an embodiment of a liquid crystal display, wherein A1 is the area of a first pixel electrode and A2 is the area of a second pixel electrode.

FIG. 7 is a graphical plot of the relationship between the ratio of the area (A1) of the first pixel electrode 260 to the total area (A1+A2) of the first and second pixel electrodes 260, 265 and the angle when gray-scale inversion occurs in a downward direction. In FIG. 7, the testing conditions are set to various voltage drops ($\Delta V=0$, 0.1 Vs, 0.2 Vs, 0.4 Vs, 0.6 Vs and 0.8 Vs) between the first and second pixel electrodes 260 and 265. When the voltage drop (ΔV) of the present liquid crystal display satisfies 0<ΔV<0.6 Vs, the angle at which gray-scale inversion occurs is greater than 20° under the 0<A1/(A1+A2)<0.8 condition. Additionally, when the voltage drop (ΔV) of the present liquid crystal display is 0.6 Vs, the angle at which gray-scale inversion occurs is greater than 20° under the 0.45<A1/(A1+A2)<0.8 condition. This verifies that the angle at which the gray-scale inversion occurs is widened downwards in comparison to the conventional TN mode liquid crystal display.

A demonstrative test of the first embodiment is described here, but it is not intended to limit the disclosure. In this test, a TN mode liquid crystal display with scanning frequency of 75 Hz and resolution of 1024×768 is employed. Referring to FIGS. 4 and 5, the ratio of W1/L1 of the first thin film transistor TFT1 is set at 3, the ratio of W2/L2 of the second thin film transistor TFT2 is set at 0.889, the gate turn on time ($t_{on}$) of the gate 215 is set at 10 μsec and the driving voltage (Vs) provided from the source line 240 is set at 5V. Thus, the charging ratio (CR1) of the first pixel electrode 260 electrically connected to the first thin film transistor TFT1 achieves about 99.36%. The charging ratio (CR2) of the second pixel electrode 265 electrically connected to the second thin film transistor TFT2 achieves about 76.71%. The calculation of the test is as follows.

Figure 8:
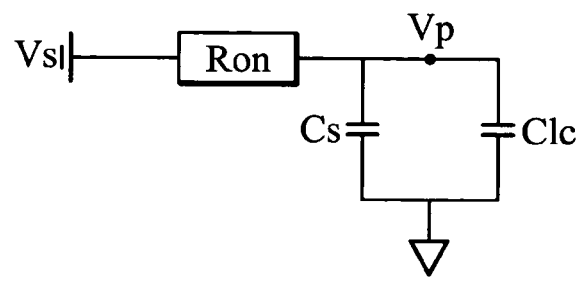
FIG. 8 is an explanatory RC circuit diagram for calculating the voltage of each pixel electrode of the first embodiment of the liquid crystal display.

The driving operation of the pixel of the liquid crystal display can be referred to as a RC circuit, as shown as FIG. 8. After the gate turn on time ($t_{on}$), the voltage (Vp) of the pixel electrode is as expressed by Equation (1) below. The charging ratio (CR) is as expressed by Equation (2) below. The ON resistance (Ron) of the thin film transistor is as expressed by Equation (3) below.

$$Vp = Vs\left(1 - e^{\frac{-t_{on}}{Ron(C_{LC}+C_{CS})}}\right) \quad (1)$$

$$CR = Vp/Vs = \left(1 - e^{\frac{-t_{on}}{Ron(C_{LC}+C_{CS})}}\right) \quad (2)$$

$$Ron = V_{SD}/I_{on} = \frac{V_{SD}}{\frac{1}{2}\frac{W}{L}C_{ox}(Vgh-Vth)^2} \quad (3)$$

The following testing parameters are used for calculating the test. The liquid crystal capacitance ($C_{LC}$) is 0.4298E-12F. The storage capacitance ($C_{CS}$) is 0.1896E-12F. The potential difference ($V_{SD}$) between the source and the drain is 10V (i.e. the inverse polarity potential between the source and the drain is ±5V). The field effect mobility (μ) of the thin film transistor is 0.35E-4 m²/V. The capacitance ($C_{ox}$) per unit surface area of a gate insulating film is 1.49E-4F/m². When a thin film transistor is in the ON state, the highest gate voltage (Vgh) is 22V. The threshold voltage (Vth) of the thin film transistor is 2V.

Regarding the first thin film transistor TFT1, since the ratio of W1/L1 is 3, the ON resistance (Ron) of the thin film transistor is 3.2 E6Ω and the charging ratio (CR1) of the first pixel electrode 260 is 99.36%. Regarding the second thin film transistor TFT2, since the ratio of W2/L2 is 0.88.9, the ON resistance (Ron) of the thin film transistor is 11.08 E6Ω and the charging ratio (CR2) of the second pixel electrode 265 is 76.71%. Thus, the voltage drop (ΔV) between the first pixel electrode 260 and the second pixel electrode 265 is 1.1V.

The voltage drop (ΔV) = (CR1 − CR2)∗Vs = 22.65%∗5 V = 1.1 V

As shown in FIG. 7, when the voltage drop (ΔV) is 0.2 Vs, the angle when gray-scale inversion occurs is greater than 25°. Accordingly, the test verifies that an embodiment of the liquid crystal display has improved gray-scale and wider viewing angle.

Second Embodiment

Figure 9:
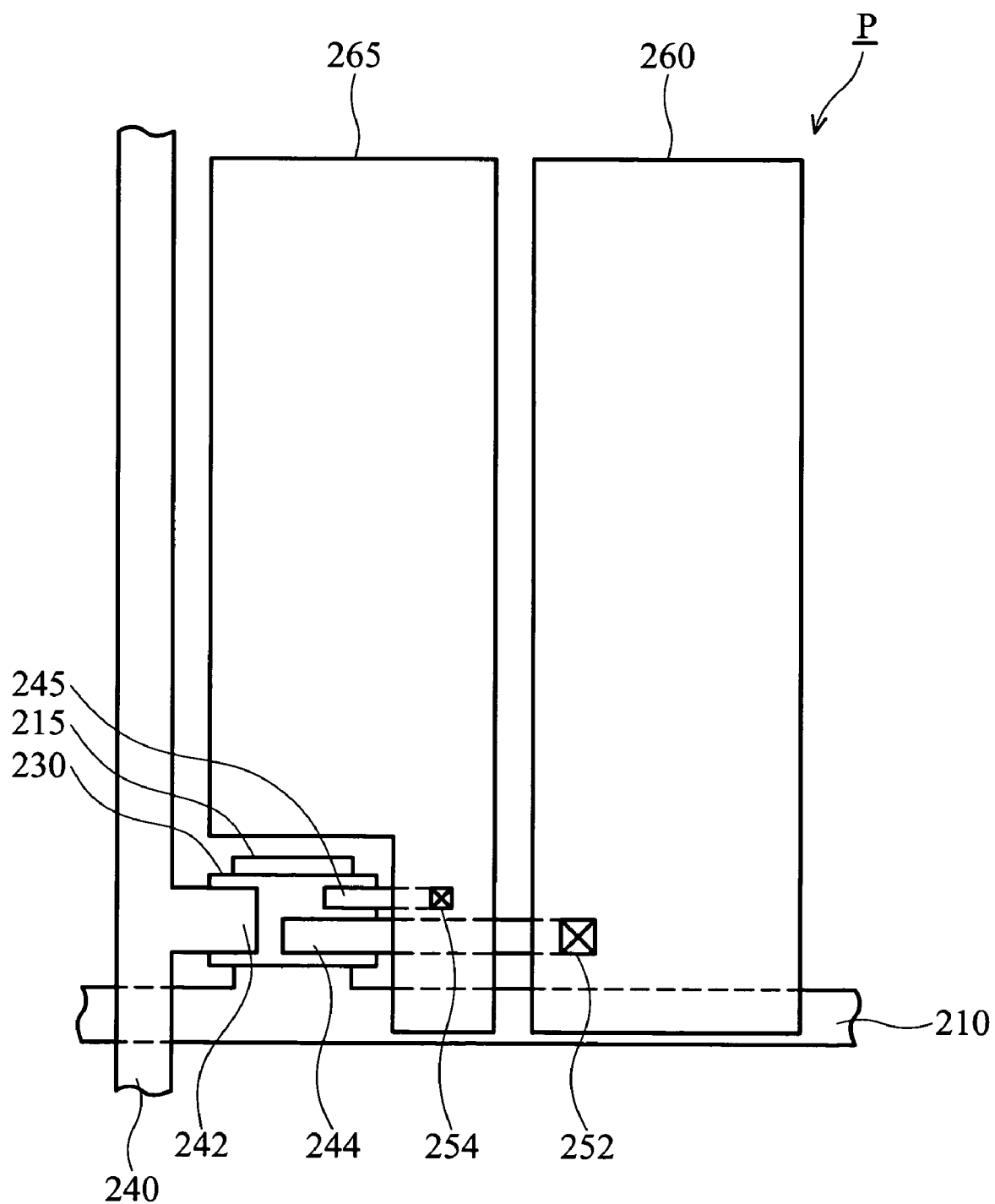
FIG. 9 is a plan view of an embodiment of a pixel area of a second embodiment of a liquid crystal display.

FIG. 9 is a plan view of a pixel area P of the second embodiment of a liquid crystal display. In this embodiment, part of the pixel electrodes 260 and 265 overlap the gate line 210 rather than the Cs line 212 overlies the first substrate 200. Aperture ratio of the pixel area P is thus increased. Since formation of the liquid crystal display of the second embodiment is similar to the first embodiment, description of detailed formation thereof is omitted here.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display comprising a plurality of pixel areas, each comprising:
    a first substrate and a second substrate disposed opposite each other with a liquid crystal layer interposed therebetween;
    a first pixel electrode and a first thin film transistor formed on part of the first substrate, wherein the first pixel electrode is electrically connected to the first thin film transistor;
    a second pixel electrode and a second thin film transistor formed on part of the first substrate, wherein the second pixel electrode is electrically connected to the second thin film transistor; and
    a common electrode formed on an interior of the second substrate;
    wherein the first and second thin film transistors have mutually different ON currents ($I_{on}$), causing the first and second pixel electrodes to have mutually different voltages, and the first and second thin film transistors comprise the same gate, the same channel layer and the same source, wherein the first thin film transistor comprises a first drain with a first width "W1" that is electrically connected to the first pixel electrode, the second thin film transistor comprises a second drain with a second width "W2" that is electrically connected to the second pixel electrode, a first interval "L1" exists between the first drain and the source, a second interval "L2" exists between the second drain and the source and a relationship between W1, W2, L1 and L2 satisfies W1/L1≠W2/L2.

2. The liquid crystal display according to claim 1, wherein the liquid crystal layer comprises two liquid crystal orientation areas having mutually different orientation directions.

3. The liquid crystal display according to claim 1, wherein the liquid crystal layer comprises TN (twisted nematic) type liquid crystal molecules.

4. The liquid crystal display according to claim 1, wherein the first and second pixel electrodes are indium tin oxide (ITO) or indium zinc oxide (IZO) layers.

5. The liquid crystal display according to claim 1, wherein the common electrode is an ITO or IZO layer.

6. The liquid crystal display according to claim 1, further comprising a transversely extending storage capacitance electrode line formed on the first substrate.

7. A liquid crystal display comprising a plurality of pixel areas, each comprising:
- a transversely extending gate line and a longitudinally extending source line formed on a first substrate;
- a thin film transistor disposed in a vicinity of an intersection of the gate line and the source line, wherein the thin film transistor comprises a first drain, a second drain, a gate, a channel layer and a source, wherein the gate is electrically connected to the gate line and the source is electrically connected to the source line, and the first drain has a first width "W1", the second drain has a second width "W2", a first interval "L1" exists between the first drain and the source, a second interval "L2" exists between the second drain and the source and a relationship between W1, W2, L1 and L2 satisfies W1/L1≠W2/L2;
- a first pixel electrode with a first area "A1" electrically connected to the source line via the first drain to cause the first pixel electrode having a first voltage;
- a second pixel electrode with a second area "A2" electrically connected to the source line via the second drain to cause the second pixel electrode having a second voltage, wherein a voltage drop "ΔV" occurs between the first and second voltages;
- a second substrate opposite the first substrate;
- a common electrode formed on an interior of the second substrate; and
- a liquid crystal layer interposed between the first and second substrates.

8. The liquid crystal display according to claim 7, wherein the liquid crystal layer comprises two liquid crystal orientation areas having mutually different orientation directions.

9. The liquid crystal display according to claim 7, wherein the liquid crystal layer comprises TN (twisted nematic) type liquid crystal molecules.

10. The liquid crystal display according to claim 7, wherein the first and second pixel electrodes are ITO or IZO layers.

11. The liquid crystal display according to claim 7, wherein the common electrode is an ITO or IZO layer.

12. The liquid crystal display according to claim 7, further comprising a transversely extending storage capacitance electrode line formed on part of the first substrate.

13. The liquid crystal display according to claim 7, wherein the source line applies a driving voltage "Vs" to the thin film transistor and when 0<ΔV<0.6Vs, the relationship between A1 and A2 satisfies 0<A1/(A1+A2)<0.8

14. The liquid crystal display according to claim 7, wherein the source line applies a driving voltage "Vs" to the thin film transistor and when ΔV is equal to 0.6Vs, the relationship A1 and A2 satisfies 0.45<A1/(A1+A2)<0.8.

* * * * *